J. W. HOFFNER.
INTERNAL COMBUSTION ENGINE.
APPLICATION FILED MAY 24, 1916.
1,220,124.
Patented Mar. 20, 1917.
3 SHEETS—SHEET 1.
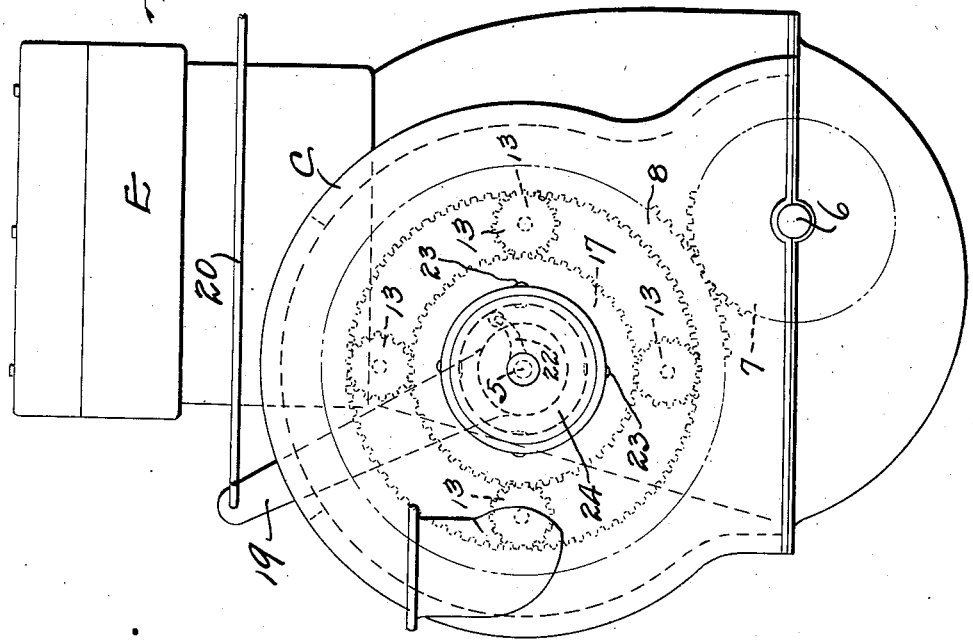
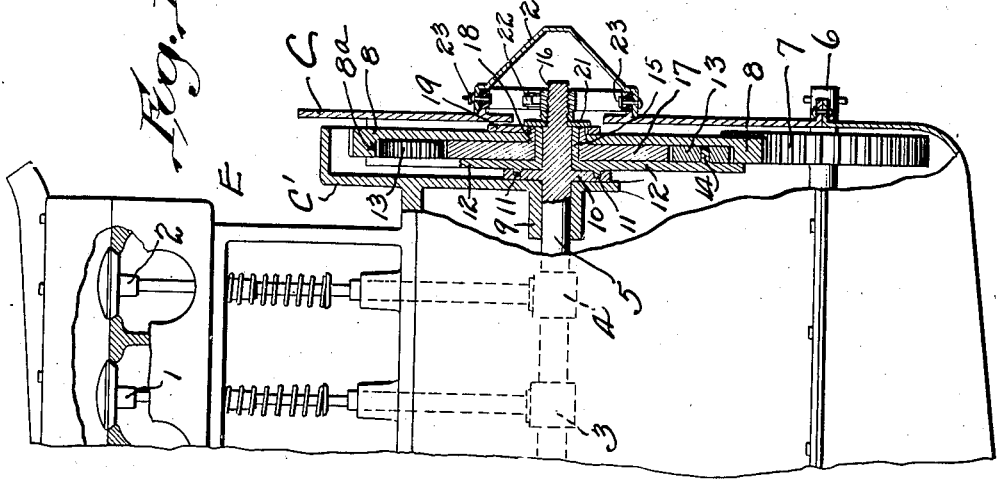
Inventor
JOHN W. HOFFNER
By S. T. Molhant
Attorney

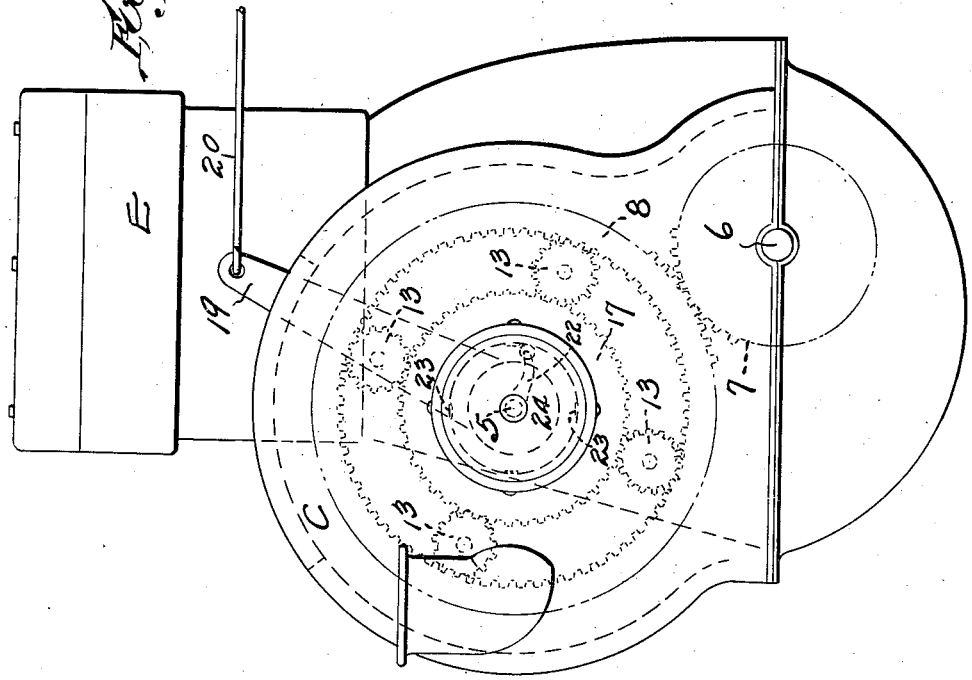

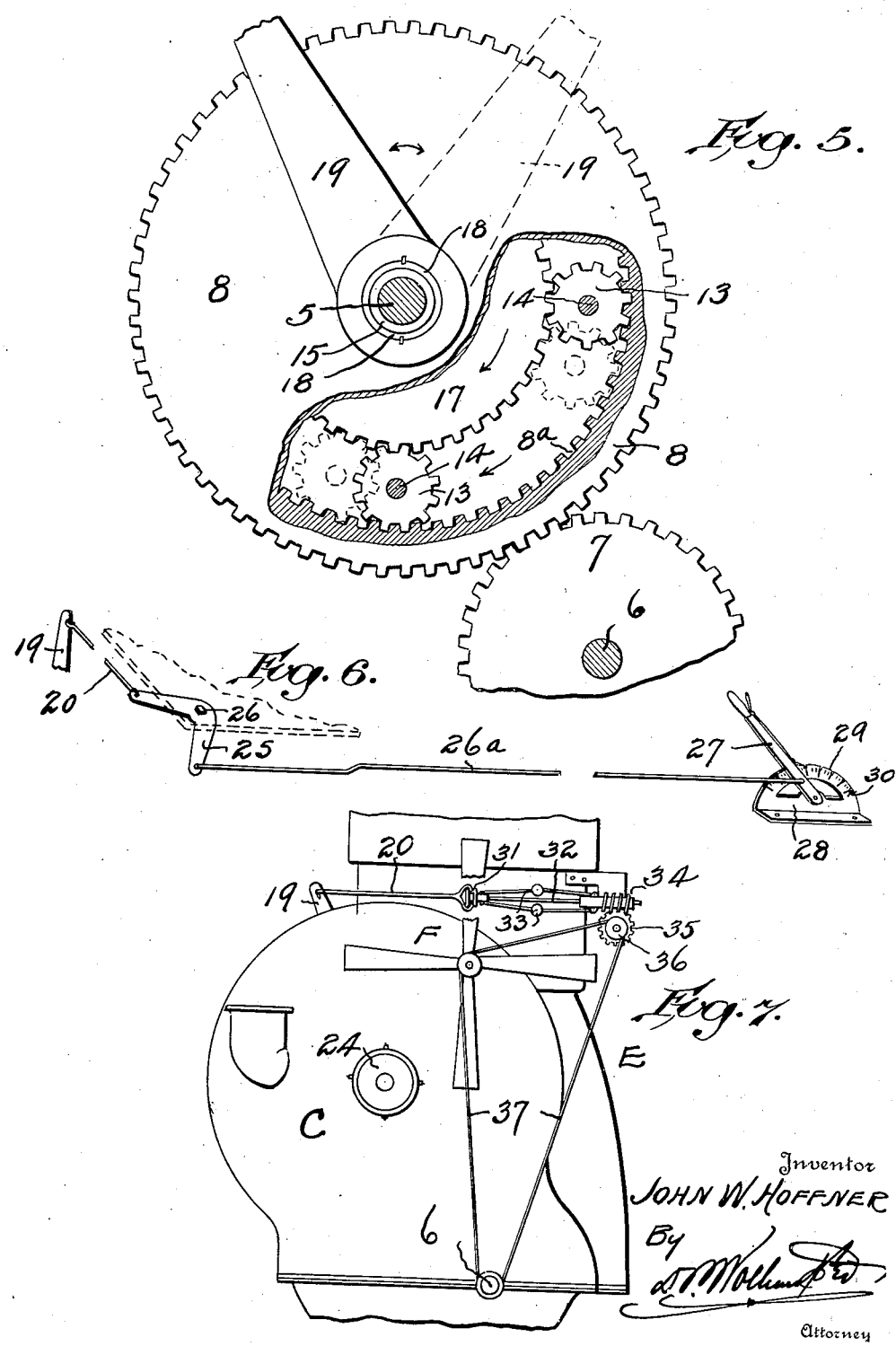

UNITED STATES PATENT OFFICE.

JOHN WESLEY HOFFNER, OF SALISBURY, NORTH CAROLINA.

INTERNAL-COMBUSTION ENGINE.

1,220,124.  Specification of Letters Patent.  Patented Mar. 20, 1917.

Application filed May 24, 1916. Serial No. 99,671.

*To all whom it may concern:*

Be it known that I, JOHN W. HOFFNER, a citizen of the United States, residing at Salisbury, in the county of Rowan and State of North Carolina, have invented certain new and useful Improvements in Internal-Combustion Engines, of which the following is a specification.

This invention relates to internal combustion engines and has particular reference to a novel improvement therein, whereby the action of the valves may be advanced in proportion to the speed of the engine, either manually or automatically.

As is well known, internal combustion engines originally have their timing gear so adjusted or gaged with relation to the crank shaft, that at a certain speed, the engine utilizes to a maximum extent all the gas furnished to the cylinders. When the engine runs at a different speed from this relatively fixed speed, the consumption of gas is disproportionate to what it should be and the engine will not run smoothly because of the fact that the gas is fed to the cylinders either slower or faster than it should be. Therefore, the present invention contemplates a novel construction whereby the position of the cam shaft may be altered either manually or automatically while the engine is running to advance or retard the valve action in proportion to the speed. Thus, according to the present invention, it is proposed to initially set the timing gear in such relation to the crank shaft that the valves will act properly at the lowest minimum speed on "low throttle," and as the speed of the engine increases the valve action will be proportionately advanced or retarded, and vice versa.

Another object of the invention is to also advance the ignition spark proportionately to the advance of the valves, thereby fully taking care of the advanced admission of the gaseous charge to the cylinders and accomplishing the firing of each charge in the same relation for all speeds. In this way, the invention proposes to utilize, to a maximum extent, the full efficiency of both the gas charge and the spark whereby maximum power is obtained with a great economy in fuel.

A further object of the invention is to provide a simple, substantial and reliable construction which may be compactly arranged, and involves no change in the construction of the engine, since it relates to the control of the cam shaft.

With the above and other objects in view which will more readily appear as the nature of the invention is better understood, the same consists in the novel construction, combination, and arrangement of parts hereinafter more fully described, illustrated and claimed.

A preferred and practical embodiment of the invention is shown in the accompanying drawings, in which—

Figure 1 is a side elevation, partly in section, showing my improved timing gear construction in its normal position.

Fig. 2 is a front elevation, showing the parts in Fig. 1.

Fig. 3 is a view similar to Fig. 1 showing the parts advanced to their extreme position.

Fig 4 is a view similar to Fig. 2 showing the relation of parts in Fig. 3.

Fig. 5 is an enlarged detail view partly in section showing the relation of the improved timing gear construction to the crank shaft.

Fig. 6 is a detail perspective view of the means for manually advancing the position of the cam shaft.

Fig. 7 is a detail elevation showing how the regulation of the position of the cam shaft may be accomplished automatically.

Similar reference characters designate corresponding parts throughout the several figures of the drawings.

By reference to the accompanying drawings, it will be observed that there is shown a portion of an internal combustion engine designated generally as E, the same including the intake and exhaust valve members 1 and 2 respectively operated by means of the cams 3 and 4 on the cam shaft 5. As usual, the engine also includes the crank shaft 6 and driving gear 7 meshing with a master timing gear 8 which forms a part of the present invention.

As will be observed from Figs. 1 and 3 of the drawings, the cam shaft 5 is journaled in the casing C of the engine as indicated at 9, and is preferably provided with an annular flange 10 which is capable of being interlocked by means of the lugs 11 with a carrier disk 12. This disk 12 has pivotally mounted thereon at equidistant points a plurality of planetary gears or pinions 13 which are freely rotatable on their spindles 14, but as stated, are movable with the disk. This disk is further provided with a collar or extension 15, which fits over the end portion of the cam shaft between the flange 10 and the threaded portion 16 thereof, and constitutes a hub on which is loosely mounted a shifter gear member 17, which is capable of meshing with all of the pinions 13 carried on the disk 12.

As will hereinafter more fully appear, though this gear is shiftable to a certain extent, it has a relatively fixed relation to the other gears, and is provided with an offset collar 18 which fits over a collar 15 of the disk 12, and provides a supporting bearing for the master timing gear 8. The extreme end of the collar 18 of this shifter gear has rigidly connected thereto, one end of the shifter lever 19, the opposite end of which extends to an exposed position beyond the timing gear casing C', as shown in Figs. 1 to 4, inclusive.

As previously indicated, the master timing gear 8 is in mesh with the crank shaft gear 7, and therefore is provided with an external gear ring, and is further provided with an internal gear ring 8ᵃ for meshing with the planetary gears 13 mounted on the carrier disk 12. Thus, it will be apparent that since the master timing gear 8 is loosely mounted on the hub 18 of the shifter gear 17, any reciprocatory movement of the shifter lever 19 will cause the shifter gear 17 to also move, since the lever is rigidly connected with the hub thereof. This movement of the lever 19 therefore being transmitted directly to the gear 17, the latter in turn, transmits this movement to the cam shaft 5 through the medium of the pinions 13 mounted on the disk 12 which is rigidly interlocked with the flange 10 on the cam shaft.

Accordingly, it will be apparent that when it is desired to advance the position of the cams 3 and 4 on the cam shaft 5 from the normal position, as shown in Figs. 1 and 2, it is only necessary to shift the lever 19 by means of a suitable operating connection 20, whereby the cam shaft will be moved so that the cams 3 and 4 are advanced to the desired extent, that is, in accordance with the speed of the engine.

Since the master timing gear 8 is loose on the hub 18, of the shifter gear 17, it will be apparent that the cam shaft 5 may be readily advanced while the engine is running at any speed. That is to say, as the gear 7 on the crank shaft 6 drives the master timing gear 8, the latter will through the pinions 13 drive the disk 12 which is rigidly connected with the cam shaft, but nevertheless the position of the latter may be readily shifted by altering the position of the shifter gear 17 by the lever 19, since the said gear is held relatively fixed, and constitutes the relatively fixed member about which the planetary gears or pinions 13 rotate during the operation of the engine.

In Fig. 1 the valves 1 and 2 are both shown in a closed position, as they would be during the compression stroke of the engine, while in Fig. 3 the inlet valve is shown raised from its seat, as it would be when the cam shaft is advanced or stepped ahead of its normal working position through the movement of the shifter lever 17. Therefore, it will be apparent that the action of both of the valves will be advanced to a certain degree in their cycle with respect to their normal position in relation to the cycle of the crank shaft, whereby, for high speeds, both the fresh gas charge and the exploded charge are respectively admitted and exhausted sooner when the engine is running at a high speed and vice versa.

Another novel and distinctive feature of the present invention resides in coördinating the action of the valves and spark in such a way that when the action of the valves is advanced, the ignition spark will also be advanced. As will be observed from the drawings, the threaded end 16 of the cam shaft is preferably provided with a holding washer 21 for securing the master timing gear and other parts firmly against the flange 10, and also carries an electrical circuit closing member 22, which is adapted to close the circuit of the several cylinders through the contact elements 23 carried by the distributer plate element 24. As the distributer plate element carrying the contacts 23 is rigidly carried by the timing gear casing C', and the circuit closing member 22 is rigidly carried by the threaded end 16 of the cam shaft 5, it will be apparent that upon the movement of the cam shaft by the lever 19, the member 22 will be correspondingly advanced with respect to the fixed contact elements 23. Thus, the spark will be advanced or retarded to correspond with the advancing or retarding of the valves.

As has been previously indicated, the exposed end of the shifter lever 19 may be manually or automatically operated, and by reference to Fig. 6, it will be observed that there has been illustrated one form of manual operating means, the same essentially comprising a bell crank lever 25 pivoted as at 26 to any desired part of the frame work of the machine or the engine to operate in the horizontal plane, and having one member thereof connected with the operating connection 20 of the shifter lever. The other member of the bell crank is preferably connected by an operating rod 26ª with a hand lever 27 pivotedly supported in a bracket 28 which may be located in any convenient and accessible place on the vehicle, and is preferably provided with a locking segment 29 having thereon suitable graduation marks or designations 30 to indicate the miles per hour at which the lever should be set to make the valves act in harmony with the speed of the machine.

In Fig. 7 there has been indicated an automatic device for carrying out this same function, and as will be observed from this figure, it is proposed to couple the operating connection 20 of the shifter lever 19 with a grooved collar member 31 which is slidable on the shaft 32 of the governor device through the provision of the expansible governor arms 33. This governor device may be of any desired type or design, but as shown in the present embodiment includes an operating worm gear 34, which meshes with a worm pinion 35 having a hub portion 36 driven by a belt connection 37 operated from the crank shaft 6 of the engine, and as shown, also operates the fan F. In utilizing an automatic device of the nature disclosed, or its equivalent, it will be apparent that the position of the cams on the cam shaft will be advanced or retarded from their original set position in proportion to the speed of the engine, and no manual attention will be necessary to effect the proper timing of the valves and the ignition spark for all speeds of the engine.

Without further description, it is thought that the important features and advantages of the invention will be readily apparent, and it will, of course, be understood that changes in the form, proportion and minor details of construction may be resorted to without departing from the spirit of the invention or scope of the appended claims.

I claim:

1. A valve regulating device for internal combustion engines, including in combination with the engine valves, the cam shaft therefor, and the engine shaft, a master timing gear geared to the engine shaft, a member rigid with the cam shaft and carrying a plurality of planetary gears meshing with the timing gear, and a toothed shifter member meshing with all of the planetary gears and having a pivotal support and an exterior adjustment connection.

2. A combined valve and spark regulating device for internal combustion engines including in combination with the engine valves, the cam shaft therefor and distributer element, of means carried by said cam shaft for advancing and retarding the position thereof to control the action of the valves and ignition spark in accordance with the speed of the engine.

3. A combined valve and spark regulating device for internal combustion engines including in combination with the engine valves, the cam shaft therefor and distributer element, of means carried by said cam shaft for advancing and retarding the position thereof to control the action of the valves and ignition spark in accordance with the speed of the engine, said means including an element rigid on the cam shaft, a relatively fixed shifter member, a driving element engaged with said element rigid with the cam shaft and operatively connected with the crank shaft, and a circuit closing member rigidly carried by said cam shaft and operating in connection with said distributer element.

4. A combined valve and spark regulating device for internal combustion engines including in combination with the engine valves, the cam shaft therefor, and distributer element, of means carried by said cam shaft for advancing and retarding the position thereof to control the action of the valves and ignition spark in accordance with the speed of the engine, said means comprising a carrier disk rigid with said cam shaft, planetary gears mounted on said carrier wheel, a relatively fixed shifter member meshing with said planetary gears and having an operating connection, a master timing gear having an internal gear ring also meshing with said planetary gears and operatively connected with the crank shaft, and a circuit closing member rigidly carried by said cam shaft and coöperating with said distributer element.

5. A combined valve and spark regulating device for internal combustion engines including in combination with the engine valves, the cam shaft therefor and distributer element, of means carried by said cam shaft for advancing and retarding the position thereof to control the action of the valves and ignition spark in accordance with the speed of the engine, said means including a carrier disk rigid with said cam shaft, planetary gears mounted on said carrier wheel at equidistant points, a hub integral with said carrier disk, a relatively fixed shifter gear loosely mounted on the hub of said carrier disk and meshing with said planetary gears, a hub portion integral with said shifter gear member, a master timing gear loosely mounted on the hub of said shifter gear member and having an internal gear ring meshing with said planetary gears, said master timing gear being operatively connected with the crank shaft, a shifter lever having one end rigidly connected with the hub of said relatively fixed shifter gear, and the other end exposed to receive an operating connection, and a circuit closing member rigidly carried by said cam shaft and coöperating with said distributer element.

In testimony whereof I hereunto affix my signature in the presence of two witnesses.

JOHN WESLEY HOFFNER.

Witnesses:
 JNO. B. MANLY,
 DAVID GRAHAM.